United States Patent [19]
Leslie

[11] Patent Number: 5,375,955
[45] Date of Patent: Dec. 27, 1994

[54] FASTENER COMPONENT IDENTIFICATION

[76] Inventor: William O. Leslie, P.O. Box 88, Troutlake, Wash. 98650

[21] Appl. No.: 856,669

[22] Filed: Mar. 24, 1992

[51] Int. Cl.$^5$ .............................................. F16B 33/00
[52] U.S. Cl. .................................... 411/378; 411/427
[58] Field of Search ............... 411/378, 427, 1, 6, 411/7, 8, 14, 373, 366, 923, 916, 917, 548; D8/387, 382; 40/429, 431, 913; 81/DIG. 5, DIG. 11, 119, 436, 177.1, 180.1, 121.1; 470/25, 109; 434/259, 260; 446/86; 116/334

[56] References Cited

U.S. PATENT DOCUMENTS

| | | | |
|---|---|---|---|
| D. 126,409 | 4/1941 | Trott | D8/387 |
| D. 245,147 | 7/1977 | Ono | D8/387 |
| 752,588 | 2/1904 | Rettig | 411/504 |
| 954,924 | 4/1910 | Brooks | 411/923 X |
| 1,516,547 | 11/1924 | Powell | 40/668 |
| 3,076,358 | 2/1963 | Paper et al. | 40/913 X |
| 3,550,244 | 12/1970 | Villo et al. | 403/292 X |
| 3,851,386 | 12/1974 | Ellzey, Jr. | 411/14 X |
| 3,916,736 | 11/1975 | Clemens | 81/DIG. 11 X |
| 5,031,488 | 7/1991 | Zumeta | 81/DIG. 5 X |
| 5,079,978 | 1/1992 | Kupfer | 81/DIG. 5 X |
| 5,181,439 | 1/1993 | Schwartz | 81/119 |

OTHER PUBLICATIONS

"Steel Structures", Charles G. Salman & John E. Johnson, 1980, pp. 96–98.
American Society for Testing and Materials (ASTM), 1984, Designations A307-83a, A563-83a, F568-83, F593-82, F738-81.

*Primary Examiner*—Rodney M. Lindsey
*Attorney, Agent, or Firm*—Klarquist Sparkman Campbell Leigh & Whinston

[57] ABSTRACT

A fastener component has size indicia thereon. The size indicia is used to identify the size of the tool to be used in attaching, adjusting or removing the fastener, a dimensional size of the fastener, or both.

4 Claims, 1 Drawing Sheet

FASTENER COMPONENT IDENTIFICATION

BACKGROUND OF INVENTION

This invention relates to methods for determining the size of fasteners, particularly nuts and bolts.

Fasteners such as nuts and bolts are among the most universal of products and are used daily by millions of people.

For the occasional user of fasteners, considerable time is wasted in determining the size of a particular fastener or fastener component. In particular, it is difficult for most people to determine the radial length or dimensions of a bolt head or nut merely by looking at the part.

A variety of techniques are used to assist the user in determining the size of the fastener part.

Fasteners usually come in bins, jars or other containers that bear labels showing the fastener sizes. But, in the normal course of working, it is common to end up with unmarked containers of assorted fastener components. Gauges are available to measure the size of such parts. And, measurements can be taken using a tape measure or ruler. Some products, such as wire nuts, are color coded.

For most fasteners, however, there is no quick visual clue to identify the fastener's size once it has been removed from its container. This results in delay while fastener components must be measured, or sized by trial and error, before they can be used.

Even more troublesome, once a fastener is selected, it is difficult to determine the size of the tool needed to secure the fastener. It is a particular problem that the dimensions given for nuts and bolts are not the same as the dimensions of the wrenches needed to tighten them. A casual user thus needs to determine the necessary wrench size by trial and error even if that person has the dimensions of the fastener components.

SUMMARY OF THE INVENTION

The present invention provides a way to rapidly identify fastener component sizes, without taking measurements.

A particular object is to provide a way to rapidly identify the tool size necessary for attaching, adjusting or removing fastener components, without taking measurements or using trial and error.

According to the present invention, fasteners bear numerical size indicia so that they can be readily identified on sight.

DETAILED DESCRIPTION

Figure 1:
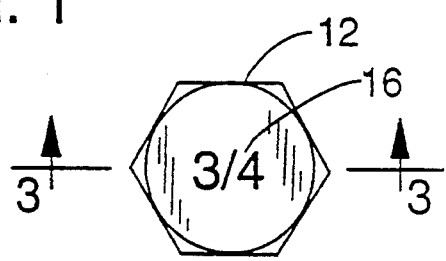
FIG. 1 is a front elevation of a bolt bearing a size indicia according to the present invention.
Figure 2:
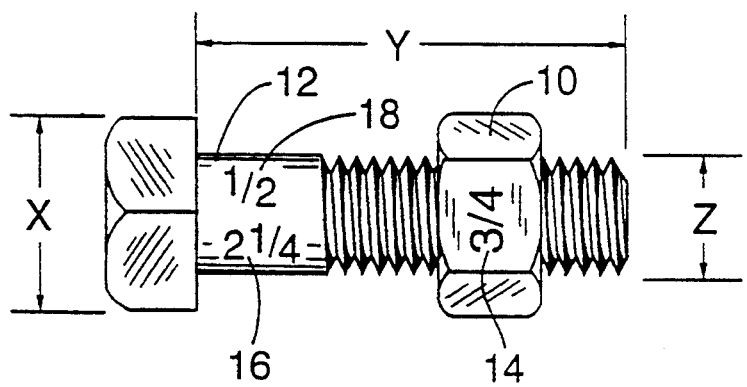
FIG. 2 is a side elevational view of the bolt shown in FIG. 1 and a nut bearing a size indicia according to the present invention.

As illustrated in the drawing figures, nut 10 and bolt 12 each bear visible numerical indicia 14, 16 which indicate the size (x) of the opening of the wrench to be used with a fastener. The fastener includes a bolt and nut, each of which has a plurality of flat, circumferential, tool-engaging faces. The size (x) is the distance between two opposed faces. In the illustrated embodiment, the indicia show the fraction "¾" which indicates ¾ inch wrenches mate with the bolt head and nut.

Although a nut and bolt are shown, the same type of indicia could be used for any type of fastener component held by a wrench, including most types of bolts, nuts, and lag screws.

Additionally, these bolts and nuts may bear indicia 16, 18 giving the length (y) and diameter (z) of the bolt shank and the inside diameter (z) of the threaded bore of the nut. But, while useful in selecting the proper fastener for a job, these dimensions are of no help in choosing the correct wrench or other installation tool since the outer dimensions of the bolt head and nut are larger. Both the indicia for indicating the proper wrench size and the indicia for indicating the fastener could be included on the same fastener.

Figure 3A:
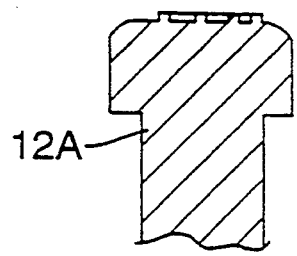
FIGS. 3 are partial sectional views taken along line 3—3 of FIG. 1, showing various forms of indicia.
Figure 3B:
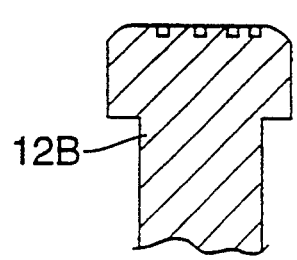
Figure 3C:
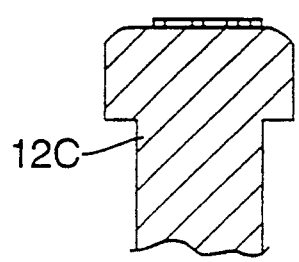

There are several ways of applying indicia to the fasteners. The illustrated bolts and nut could be made using molds which apply either recessed or raised numbers when the fastener parts are cast. Raised numbers are shown in FIG. 3A; recessed numbers are shown in FIG. 3B. The raised numbers could also be in braille rather than arabic numbers for the visually impaired. In a preferred embodiment, indicia could be stamped on using conventional metal stamping techniques. Less preferably, the indicia could be painted on as shown in FIG. 3C. Paint is not preferred since it can wear off with time.

Having illustrated and described the principles of my invention with respect to a preferred embodiment, it should be apparent to those skilled in the art that my invention may be modified in arrangement and detail without departing from such principles. For example, while the invention will be most widely useful for bolts and nuts, it will be particularly helpful whenever the size of an installation tool is different than the stated size of a fastener component with which the tool will be used. Also, although the drawings illustrate a bolt and nut sized in inches, the present invention can be used for fastener components sized in metric, or any other, units. I claim all such modifications falling within the scope and spirit of the following claims.

I claim:

1. A fastener component adapted to be installed, adjusted or removed by a tool, the component comprising:
   a body comprising a threaded shaft extending from a polygonal head which has a plurality of flat circumferential faces that provide at least one tool-engaging surface; and
   located on the body, at least one visible numeral which indicates the distance between the opposed faces and, thus, the size of a tool suitable for engaging the surface, so that a suitable tool can be selected without a user having to know or measure any other dimension of the fastener component.

2. The fastener component of claim 1 wherein the body is a bolt or lag screw.

3. A fastener component adapted to be installed, adjusted or removed by a tool, the component comprising:
   a body comprising a threaded shaft extending from a polygonal head which has a plurality of flat circumferential faces that provide at least one tool-engaging surface;
   located on the body, at least one visible numeral which indicates the distance between opposed faces and, thus, the size of a tool suitable for engaging the surface, so that a suitable tool can be selected without a user having to know or measure any other dimension of the fastener component; and located on the body, at least one indicia of the length and diameter of the shaft.

4. The fastener component of claim 3 wherein the body is a bolt or lag screw.

* * * * *